United States Patent Office 3,287,415
Patented Nov. 22, 1966

3,287,415
BORON ALKYLS, AND A PROCESS FOR THE PRODUCTION OF BORON HYDROCARBONS
Roland Köster, Mulheim (Ruhr), Germany, assignor to Studiengesellschaft Kohle m.b.H., Mulheim (Ruhr), Germany, a corporation of Germany
No Drawing. Filed Apr. 28, 1958, Ser. No. 731,126
Claims priority, application Germany, Apr. 29, 1957, Z 6,105
15 Claims. (Cl. 260—606.5)

This invention relates to new boron alkyls, and a process for the production of boron hydrocarbons.

It is known that gaseous boron hydride $B_2H_6$ is added-on, under certain pressure and temperature conditions, to olefines to form aliphatic boron hydrocarbons:

$$B_2H_6 + 6C_nH_{2n} = 2B(C_nH_{2n+1})_3$$

(c.f. D.T. Hurd: J. Am. Chem. Soc., 70, 2053/5 (1948). This adding-on of the boron hydride bond at the olefinic C=C double bond cannot readily be used for complex metal borohydrides, such as lithium borohydride, sodium borohydride or calcium borohydride. Due to the complex bonding of the metal hydride to the borohydride, in these compounds, the reactivity of the boron hydride bond with respect to olefines obviously disappears. In accordance with most recent results, the reaction can be forced to occur by the artifice of using aluminium chloride (see H. C Brown, B. C. Subba Rao: J. Am. Chem. Soc., 78, 5694/5 (1956)). According to the equation $$AlCl_3 + 3NaBH_4 \rightarrow 3NaCl + Al(BH_4)_3$$

there is obviously an initial formation of aluminium borohydride, which it is known is able to form boron trialkyls with olefines.

Since the gaseous boron hydride $B_2H_6$ used as starting material is very sensitive to moisture and is extremely toxic, it is not advantageous to use this hydride for the production of boron trialkyls. In addition, the control of the gas supply is not easy. Furthermore, it is necessary to work under pressure, and this causes further difficulties in the process. When metal borohydrides are used in the presence of aluminium chloride, an increased consumption of material is necessary for the production of boron trialkyls. In addition, the working up of the reaction products, and especially the separation of the salts which are formed, is very difficult in certain circumstances.

It has now surprisingly been established that trialkylamineboranes of the general formula $H_3B \cdot NR'_3$, in which R' represents any desired hydrocarbon radical, and which are preferably produced by the process disclosed in Belgian Patent No. 558,170, U.S. Application No. 663,368, and are very stable compounds, are capable of reacting with olefines. In this reaction, a tertiary amine is liberated and the borine fraction is added-on to the olefines:

$$H_3B \cdot NR'_3 + 3R_2C = CR_2 \rightarrow B(R_2C-CHR_2)_3 + NR'_3$$

Each of the substituents R can be a hydrogen atom or a like or different substituted or unsubstituted hydrocarbon radical preferably an aliphatic, cycloaliphatic or aromatic radical, which if desired can be combined to form a ring.

This reaction is surprising, since the trialkylamineboranes can, like the metal borohydrides, be regarded as complex compounds of borine $BH_3$ and, as set out above, it is known of the metal borohydrides that they do not react with olefines in a corresponding reaction.

In accordance with the invention, for the production of aliphatic boron hydrocarbons, trialkylamineboranes are heated with olefines of the general formula $R_2C = CR_2$, in which each R represents a hydrogen atom or a hydrocarbon radical, or with diolefines or with compounds having more than 2 C=C double bonds, in the absence of oxygen and moisture to temperatures higher than 100° C.; after the reaction has ended, the amine and boron hydrocarbon are separated by distillation. When α-olefines are used, the addition of the boron hydride takes place preferentially on the terminal carbon atom, and unbranched boron trialkyls are formed. When olefines with C=C double bonds in a middle position are used, final products are obtained which have branched chains. With polyolefines, oily liquids which cannot be distilled or can only be distilled with difficulty are frequently formed by polymerization, but these liquids contain the boron-carbon bonds and thus have the properties of boron trialkyls. Poly-olefines can also be made to produce monomeric addition compounds of the boron hydride by the use of suitable reaction conditions. For example, when cyclododecatri-(1,5,9)-ene and trialkylamineborane are used as starting materials, a compound of the empirical formula $C_{12}H_{21}B$ is obtained in a yield of more than 70% of the theoretical. This is apparently a heterocyclic compound, which is formed according to the following equation:

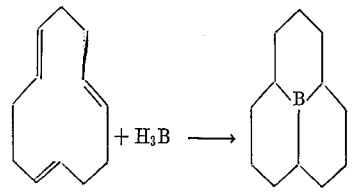

A mixture of isomeric ring systems can also be present for example a ring system with three six-membered rings or a ring system with a five-membered ring, six-membered ring and a seven-membered ring.

One example of a suitable starting mixture for use in the process of the invention comprises 3 mols of a monoolefine and 1 mol of a trialkylamineborane. The mixture is preferably heated to temperatures between 130 and 160° C. The temperature can be raised still further, but this gives no particular advantage. The reaction is complete after a few hours. The trialkylamineboranes used in the process are preferably chosen having in mind the nature of the boron trialkyl to be formed, since the amine which is liberated should have a boiling point which differs sufficiently from that of the aliphatic boron hydrocarbon being formed.

Generally speaking, when gaseous olefines are being reacted by the process of the invention, it is not essential to use pressure. It is in fact sufficient for a low-boiling olefine (for example propylene) to be passed through a trialkylamineborane heated to about 130–140° C. The olefine is then converted into the boron trialkyl, and the amine is liberated. After the reaction is complete the amine is separated from the boron hydrocarbon by a simple distillation procedure. It is of course also possible to work under pressure in the reaction of low-boiling or gaseous olefines such as ethylene, but this is not essential.

Solvents and diluents are generally not essential for the reaction of olefines with trialkylamineboranes, but they can be used. In certain circumstances there is an advantage in working in a diluted reaction medium, i.e. by using a solvent: for example, when poly-olefines are being reacted it is essential to use a diluent if a smooth reaction is to be obtained. Solvents are moreover always advisable when solid trialkylamineboranes are used as starting compounds.

All saturated aliphatic hydrocarbons are suitable as solvents or diluents, as are aromatic hydrocarbons. It is also possible to use ethers and tertiary amines as diluents.

By comparison with the state of the art, the process of the invention has the advantage that it is not necessary to use any gaseous or solid boron hydride compounds. The products of the process are inter alia suitable as fuel additives. With the aid of oxidising agents, it is also possible to produce therefrom alkyl boric acid esters, from which free alkyl boric acids as well as the corresponding alcohols are obtainable by subsequent saponification.

Amongst the products which can be produced by the process of the invention are compounds which so far have never been produced, especially the heterocyclic boron alkyls with a relatively large number of carbon atoms. A heterocyclic boron alkyl of the formula $$B(C_{12}H_{21})$$

with a boiling point of 130–131° C. at 16 mm. Hg, and a heterocyclic boron tri-alkyl of the formula $B_2(C_4H_8)_3$ with a boiling point $_{0.2-0.3\ mm.}$ of 70–80° C., are new compounds provided by the invention. The heterocyclic higher boron alkyls, especially the compound $B(C_{12}H_{21})$, show remarkable properties which differ from those of the known boron trialkyls with normal hydrocarbon chains. For example, these heterocyclic boron compounds cannot be hydrogenated with hydrogen under pressure under the conditions usual for boron trialkyls having normal chains. Furthermore, the known displacement reaction with olefines, for example with ethylene, does not occur with the heterocyclic boron compounds.

The compound $BC_{12}H_{21}$ can occur in different structural isomeric forms. The form with three 6-membered rings is preferentially obtained by the process of the invention:

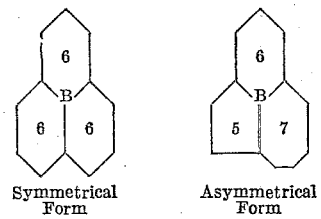

Symmetrical Form     Asymmetrical Form

The boron trialkyl of the formula $B_2(C_4H_8)_3$ can also occur in two different structural isomeric forms:

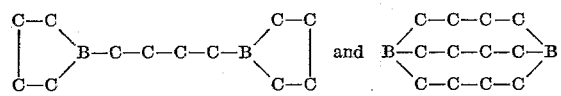

Each C represents a $CH_2$ group in these formulae.

This compound has the remarkable property that, in spite of its high boiling point of B.P. $_{0.2-0.3\ mm.}$=70–80° C., it ignites immediately in air. Such a tendency to ignite occurs only with the low-boiling representatives of known normal boron alkyls, especially boron trimethyl and boron triethyl, which have boiling points of less than 100° C. at normal pressure.

The following examples further illustrate the invention.

*Example 1*

$$H_3B \cdot N(C_2H_5)_3 + 3C_{10}H_{20} = B(C_{10}H_{21})_3 + N(C_2H_5)_3$$

426 g. (3 mols) of decene-1 are placed in a 1-litre three-necked flask (fitted with thermometer, stirrer and dropping device) under nitrogen. The flask is heated while stirring to 120–130° C. and a total of 115 g. (1 mol) of triethylamineborane is added dropwise over a period of about 30 minutes. The triethylamine has then split off; it is immediately distilled off by means through a reflux condenser which is connected to the flask. After the dropping-in is complete, heating is continued for approximately 1 hour at 130–140° C. The residual amine is thereafter removed at reduced pressure from the reaction mixture. 100 g. (approximately 1 mol) of triethylamine is obtained in the distillate. As a residue, there is left tridecyl boron (440 g.) which is a colourless, clear and slightly viscous liquid. The compound cannot be distilled without decomposition (decene being split off). The benzoic peracid value of the residue corresponds to the calculated molecular weight of tridecyl boron. The yield is quantitative.

*Example 2*

$$H_3B \cdot N(n—C_4H_9)_3 + 3C_2H_4 \rightarrow B(C_2H_5)_3 + N(n—C_4H_9)_3$$

92.5 g. (0.5 mol) of tri-n-butylamineborane are placed in a 500 cc. autoclave under nitrogen, and a quantitative yield of triethyl boron is obtained by introducing 42 g. (1.5 mols) of ethylene under pressure and heating to 150° C. for 2–3 hours (the pressure drops from 65 atm. at room temperature to about 5 atm. at room temperature). The liquid obtained is discharged under nitrogen and distilled, whereupon triethyl boron with a boiling point of 94–95° C., distils over as the first fraction. All the tri-n-butylamine is found in the residue.

*Example 3*

$$H_3B \cdot N(n—C_4H_9)_3 + 3C_2H_4 \rightarrow B(C_2H_5)_3 + N(n—C_4H_9)_3$$

185 g. (1 mol) of tri-n-butylamineborane are heated while stirring and with exclusion of moisture and oxygen to 130–140° C. Over a period of 4–5 hours, purified ethylene is passed through the liquid with a flow velocity of about 5–6 litres per hour. Boron triethyl is formed, and also tri-n-butylamine; the boron triethyl is condensed out with the aid of a condenser connected to the apparatus and is collected in a receiver. Boron triethyl is obtained with approximately a 95% yield and with a boiling point of 94–95° C.

*Example 4*

$$H_3B \cdot N(C_2H_5)_2(n—C_4H_9) + 3C_6H_{10} \rightarrow$$
$$B(C_6H_{11})_3 + N(C_2H_5)_2(n—C_4H_9)$$

143 g. of (1 mol) of diethyl-n-butylamineborane are heated under nitrogen and under reflux to 130–140° C. in a 500 cc. three-necked flask (fitted with thermometer, dropping funnel and stirrer). 246 g. (3 mols) of cyclohexene are slowly added dropwise while stirring thoroughly, so that the temperature of the reaction mixture does not fall below 130° C. Corresponding to the reaction of the olefine, diethyl-n-butylamine is liberated. After the dropwise addition is complete, heating is continued for 5–6 hours to complete the reaction. The amine (1 mol) is thereafter distilled off under reduced pressure. The residue is cooled, and crystallizes at about 110° C. The melting point of the tricyclohexyl boron completely freed from the amine is 114–115° C. without separate purification. The yield is quantitative.

*Example 5*

$$H_3B \cdot N(C_2H_5)_3 + 3C_7H_{10} \rightarrow B(C_7H_{11})_3 + N(C_2H_5)_3$$

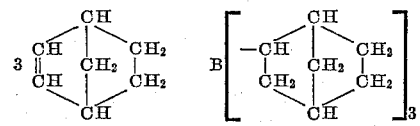

134 g. of a colourless liquid mixture is obtained from 39.1 g. (0.34 mol) of triethylamineborane and 95.7 g. (1.02 mols) of dicyclo-(2,2,1)-heptene-(2), by heating the reactants in a 200 cc. pressure vessel to a maximum of 150° C. for 4–5 hours, and emptying the resulting mixture out of the vessel. After the amine formed has been distilled off under reduced pressure, the whole of the residue solidifies. The tri-(cycloheptyl)-boron obtained has a melting point of 100–101° C. The yield is quantitative. The compound can be distilled without decomposition at greatly reduced pressure.

*Example 6*

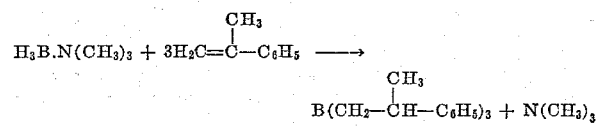

73 g. (1 mol) of trimethylamineborane are heated with 356 g. (3 mols) of α-methyl styrene under nitrogen and while stirring well; a total of 54 g. (about 0.9 mol) of triethylamine escape from the reaction mixture over a period of 3–4 hours. The remainder of the amine is removed under reduced pressure. A colourless oily liquid is obtained, the benzoic peracid value of which corresponds to tri-(2-phenylpropyl)-boron. The yield is quantitative.

*Example 7*

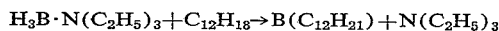
$H_3B \cdot N(C_2H_5)_3 + C_{12}H_{18} \rightarrow B(C_{12}H_{21}) + N(C_2H_5)_3$ 200 cc. of perhydrocumene are heated under nitrogen to 140° C. in a 1-litre three-necked flask (fitted with thermometer, stirrer and dropping funnel, also a reflux condenser). An equimolecular mixture of cyclododecatri-(1,5,9)ene (162 g.=1 mol) and triethylamineborane (115 g.=1 mol), dissolved in 200 cc. of perhydrocumene, is slowly added dropwise (over a period of about 5–6 hours) at 140° C. The amine (a total of 95 g.) is distilled off with some solvent. Thereafter all the solvent is removed, together with the residual amine, by distillation under reduced pressure. The residue, which is a completely colourless slightly viscous liquid, can be distilled. As distillate (B.P.$_{0.3-0.4\ mm.}$=74/75° C.) there are obtained about 130 g. of a fraction (heterocyclic boron alkyl) with a constant boiling point, the benzoic peracid value of which corresponds to the molecular weight of the compound $C_{12}H_{21}B$ (yield about 75% of the theoretical). As residue, a compound is left which solidifies in vitreous form after cooling and which also still contains boron, but has a substantially higher molecular weight.

*Example 8*

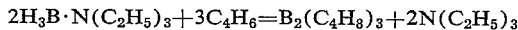
$2H_3B \cdot N(C_2H_5)_3 + 3C_4H_6 = B_2(C_4H_8)_3 + 2N(C_2H_5)_3$

A total of 81 g. (1.5 mols) of butadiene is introduced at 150° C. over a period of about 3 hours into 115 g. (1 mol) of triethylamineborane while stirring (with exclusion of air and moisture). The amine liberated distils off. After the introduction of the butadiene is complete, heating is continued for 30 minutes at 150–160° C. and thereafter the boron alkyl which is formed is distilled off. As distillate (B.P.$_{0.2-0.3\ mm.}$=70–80° C.), there are obtained 75 g. of a colourless very mobile liquid, which ignites spontaneously in air. The benzoic peracid value and the boron content of the compound corresponds to the empirical formula $B_2(C_4H_8)_3$. As distillation residue there is left a viscous liquid of higher molecular weight.

*Example 9*

This example describes the production of the boron alkyl $C_{12}H_{21}B$ in a high yield:

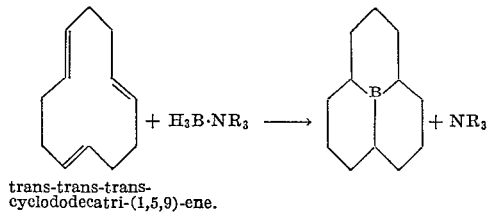

trans-trans-trans-cyclododecatri-(1,5,9)-ene.

200 cc. of perhydrocumene are heated to 150–160° C. in a 1 litre three-necked flask (fitted with thermometer, stirrer, dropping funnel and attached reflux condenser). While stirring well, a mixture of 140 g. (1.21 mol) of n-triethylaminoborane and 195 g. (1.205 mol) of trans-trans-trans-cyclododecatri-(1,5,9)-ene, dissolved in another 200 cc. of perhydrocumene, is added dropwise over a period of 7–8 hours. The amine liberated is directly distilled off with some solvent. Thereafter, the residual perhydrocumene is recovered in vacuo by means of a small column (B.P.$_{16\ mm.}$=52–55° C.). As main fraction, there are obtained 202 g. (=95% of the theoretical) of a colourless liquid which is extremely sensitive to air and boils at 130–131° C. at a pressure of 16 mm. Hg, the benzoic peracid value of this liquid corresponding to the formula $C_{12}H_{21}B$. About 10 cc. of a liquid solidifying in vitreous form (a compound of higher molecular weight) are left as residue.

The compound $C_{12}H_{21}B$ can be oxidised to give the corresponding boric acid ester. It also provides an addition product with ammonia.

What I claim is:

1. Process for the production of boron hydrocarbons, which comprises heating a trialkyl amine borane, in which alkyl represents a lower alkyl group, with an unsaturated hydrocarbon having at least one C=C bond in the absence of oxygen and moisture to a temperature higher than 100° C. and thereafter separating the amine and boron hydrocarbon present in the reaction product by distillation.

2. Process according to claim 1, which comprises effecting the heating to a temperature of from 120 to 160° C.

3. Process according to claim 1, which comprises selecting said trialkyl amine borane so that the amine liberated has a boiling point which differs substantially from the boiling point of the boron hydrocarbon formed.

4. Process according to claim 1, carried out under pressure using as hydrocarbon starting material a low-boiling hydrocarbon.

5. Process according to claim 1, carried out under pressure using as hydrocarbon starting material a gaseous hydrocarbon.

6. Process according to claim 1, carried out in the presence of an inert solvent.

7. Process according to claim 6, wherein said solvent is a member selected from the group consisting of saturated aliphatic and aromatic hydrocarbons, ethers and tertiary amines.

8. Process according to claim 1, characterized in that the starting mixture of trialkyl amine borane and hydrocarbon is prepared beforehand by mixing said trialkyl amine borane and hydrocarbon at a temperature below 80° C. in the stoichiometric amounts corresponding to the reaction.

9. Process according to claim 8, which comprises preparing said starting mixture at room temperature.

10. Process according to claim 1, wherein said hydrocarbon has the general formula $R_2C=CR_2$, in which each R is a member selected from the group consisting of hydrogen and hydrocarbon radicals having up to 20 carbon atoms in their molecules.

11. Process according to claim 10, wherein R is a member selected from the group consisting of aliphatic, cycloaliphatic and aromatic hydrocarbon radicals.

12. Process according to claim 10, wherein said two radicals designated "R" are closed to form a low number of rings.

13. A heterocyclic boron alkyl endoboroncyclododecyl of the formula $B(C_{12}H_{21})$ with a boiling point of 130–131° C. at 16 mm. Hg.

14. A heterocyclic boron compound of the formula $B_2(C_4H_8)_3$ with a B.P.$_{0.2-0.3\ mm.}$ of 70–80° C. and having at least one of the structural isomeric forms:

(a)
(b)

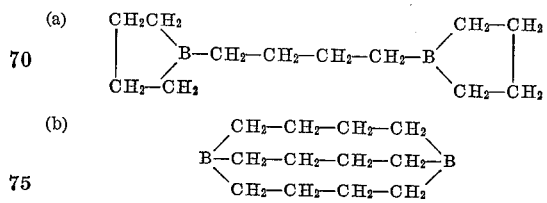

15. A boron heterocycle having a boron in the carbocyclic ring prepared by heating a trialkyl amine borane in which alkyl represents a lower alkyl group with an unsaturated hydrocarbon having at least two C=C bonds in the absence of oxygen and moisture to a temperature higher than 100° C.

References Cited by the Examiner

UNITED STATES PATENTS 2,835,693   5/1958   Buls et al. _____ 260—462

OTHER REFERENCES

Patterson, Chemical and Engineering News, vol. 34, p. 560, 1956.

The Van Nostrand Chemist's Dictionary, D. Van Nostrand Co., Inc., New York, 1953, p. 498.

Torssell, Acta Chem. Scan., vol. 8, 1954, p. 1780.

TOBIAS E. LEVOW, *Primary Examiner.*

LEON D. ROSDOL, ROGER L. CAMPBELL, L. A. SEBASTIAN, F. R. OWENS, W. F. W. BELLAMY, *Assistant Examiners.*